(12) United States Patent
Goto et al.

(10) Patent No.: US 10,910,740 B2
(45) Date of Patent: Feb. 2, 2021

(54) TERMINAL BASE, TRIPLE TERMINAL BASE, AND IN-VEHICLE APPARATUS

(71) Applicant: YAZAKI CORPORATION, Tokyo (JP)

(72) Inventors: Hiroki Goto, Makinohara (JP); Naoki Isaka, Makinohara (JP); Keisuke Ozawa, Makinohara (JP); Takuya Nakayama, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/656,565

(22) Filed: Oct. 17, 2019

(65) Prior Publication Data

US 2020/0122657 A1 Apr. 23, 2020

(30) Foreign Application Priority Data

Oct. 23, 2018 (JP) ................................. 2018-199269

(51) Int. Cl.
*H01R 9/22* (2006.01)
*H01R 9/18* (2006.01)
*H01R 13/52* (2006.01)

(52) U.S. Cl.
CPC ............... *H01R 9/223* (2013.01); *H01R 9/18* (2013.01); *H01R 13/521* (2013.01); *H01R 2201/26* (2013.01)

(58) Field of Classification Search
CPC ............................ B60R 16/0238; H01R 9/223
See application file for complete search history.

(56) References Cited

U.S. PATENT DOCUMENTS

| 2013/0217262 A1 | 8/2013 | Ikeda et al. |
| 2016/0087371 A1 | 3/2016 | Eom et al. |

FOREIGN PATENT DOCUMENTS

| JP | 2012-69261 A | 4/2012 |
| JP | 2015-42109 A | 3/2015 |
| JP | 2016-62897 A | 4/2016 |

*Primary Examiner* — Ross N Gushi
(74) *Attorney, Agent, or Firm* — Kenealy Vaidya LLP (57) ABSTRACT

A terminal base includes a straight, strip plate-shaped bus bar having a first end and a second end, the first end having a bolt insertion hole, a bolt configured to be inserted into the bolt insertion hole for electrical connection, the bolt having a head, a housing into which the bus bar is inserted from the second end of the bus bar such that the second end extends out of the housing, an O-ring configured to be mounted on the bus bar at a middle of the bus bar to seal a gap between the bus bar and the housing and a holder configured to regulate a movement of the O-ring. The holder is provided on the bus bar. The holder includes a bolt holding portion configured to hold an outer periphery of the head of the bolt over an entire circumference of the outer periphery of the head.

8 Claims, 12 Drawing Sheets

TERMINAL BASE, TRIPLE TERMINAL BASE, AND IN-VEHICLE APPARATUS

CROSS-REFERENCE TO RELATED APPLICATION

The present application claims priority to Japanese Patent Application No. 2018-199269 filed on Oct. 23, 2018, the entire content of which is incorporated herein by reference.

TECHNICAL FIELD

The present invention relates to a terminal base including a strip-shaped bus bar, a bolt for electrical connection, a housing into which the bus bar is to be inserted, an O-ring for waterproofing, and a holder that restricts movement of the O-ring. The present invention also relates to a triple terminal base in which three terminal bases are connected. The present invention further relates to an in-vehicle apparatus including the terminal base or the triple terminal base.

BACKGROUND

A related art terminal base is attached to a wall of an apparatus box and is used for electrical connection between an inner side and an outer side of the wall (see JP2015-42109A, for example). The terminal base includes a housing attached to the wall of the apparatus box, a bolt for electrical connection that is assembled to a bolt accommodating portion of the housing, and a strip-shaped bus bar assembled to the bolt and the housing after the bolt is accommodated in the bolt accommodating portion. The bolt accommodating portion is formed in a shape such that a bolt head can be inserted by sliding from a direction orthogonal to a bolt shaft.

In the above configuration and structure, the terminal base completes the electrical connection by first inserting a terminal provided at a wire end into the bolt shaft, and then firmly tightening the terminal and the bus bar with a nut.

According to the related art, since the bolt accommodating portion of the housing is formed in a shape such that the bolt can be inserted by sliding, the bolt head is held at a portion other than an opening portion passed through during the insertion, that is, at a side portion of the bolt accommodating portion. Accordingly, the nut is tightened in a state without being held at the opening portion, and when the tightening is strengthened, there is a problem that damaged occurs due to a force that tends to rotate the bolt head.

SUMMARY

Illustrative aspects of the present invention provide a terminal base capable of preventing damage during electrical connection, a triple terminal base in which three terminal bases are arranged next to one another, and an in-vehicle apparatus including the terminal base or the triple terminal base.

According to an aspect of the present invention, a terminal base includes a straight; strip plate-shaped bus bar having a first end and a second end, the first end having a bolt insertion hole, a bolt configured to be inserted into the bolt insertion hole for electrical connection, the bolt having a head, a housing into which the bus bar is inserted from the second end of the bus bar such that the second end extends out of the housing, an O-ring configured to be mounted on the bus bar at a middle of the bus bar to seal a gap between the bus bar and the housing and a holder configured to regulate a movement of the O-ring. The holder is provided on the bus bar. The holder includes a bolt holding portion configured to hold an outer periphery of the head of the bolt over an entire circumference of the outer periphery of the head.

BRIEF DESCRIPTION OF DRAWINGS

FIGS. 1A and 1B illustrate a triple terminal base including a terminal base according to an embodiment of the present invention, in which

FIG. 2 is an exploded perspective view of the triple terminal base of FIGS. 1A and 1B, FIGS. 3A and 3B illustrate a housing, in which FIG. 39 is a plan view;

FIGS. 4A and 4B illustrate a bus bar unit of FIGS. 1A, 1B and 2, in which

FIGS. 6A and 6B illustrate a housing of FIG. 5, in which

FIGS. 7A and 7B illustrate the bus bar unit of FIG. 5, in which FIG. 5B is a perspective view as viewed from the bottom surface side;

FIGS. 11A to 11C illustrate a holder and a bus bar, in which

DESCRIPTION OF EMBODIMENTS

Figure 1A:
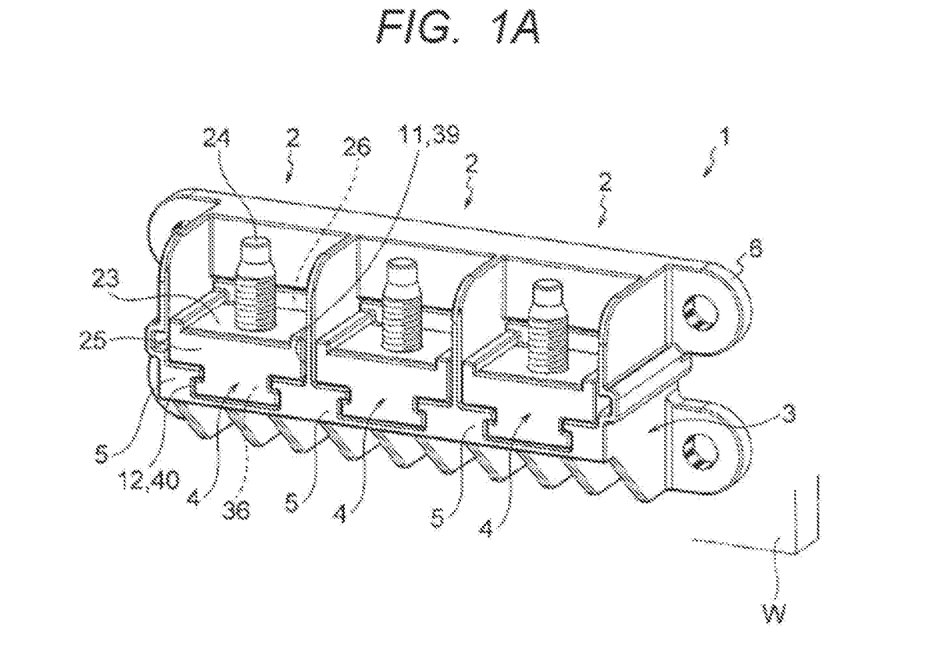
FIG. 1A is a perspective view and FIG. 1B is a plan view.
Figure 1B:
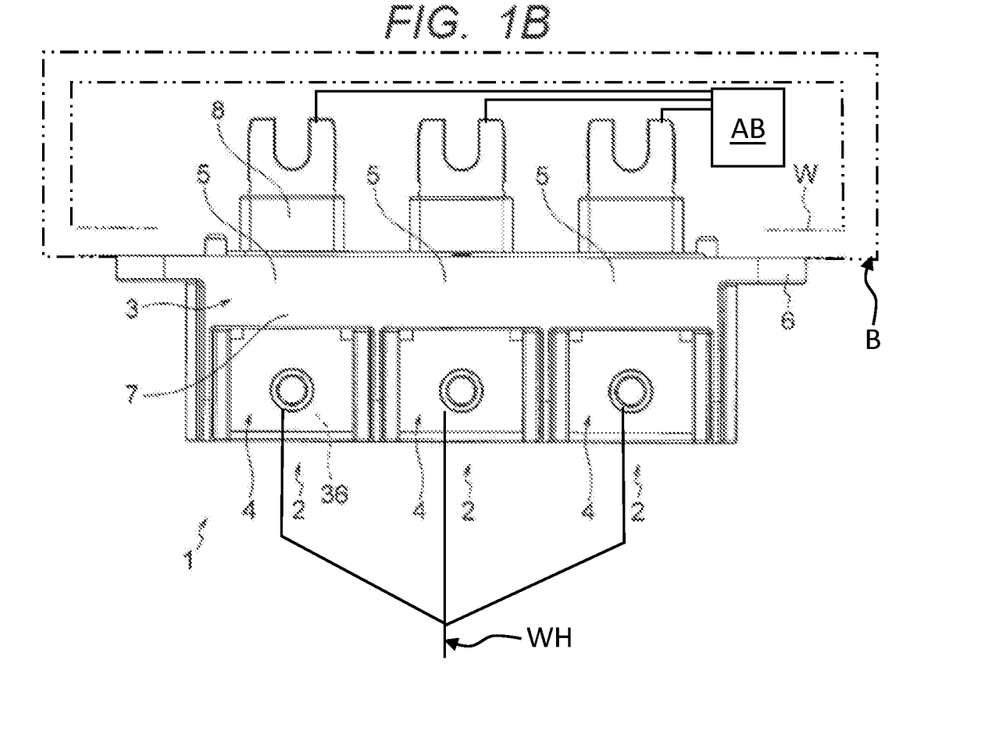
Figure 2:
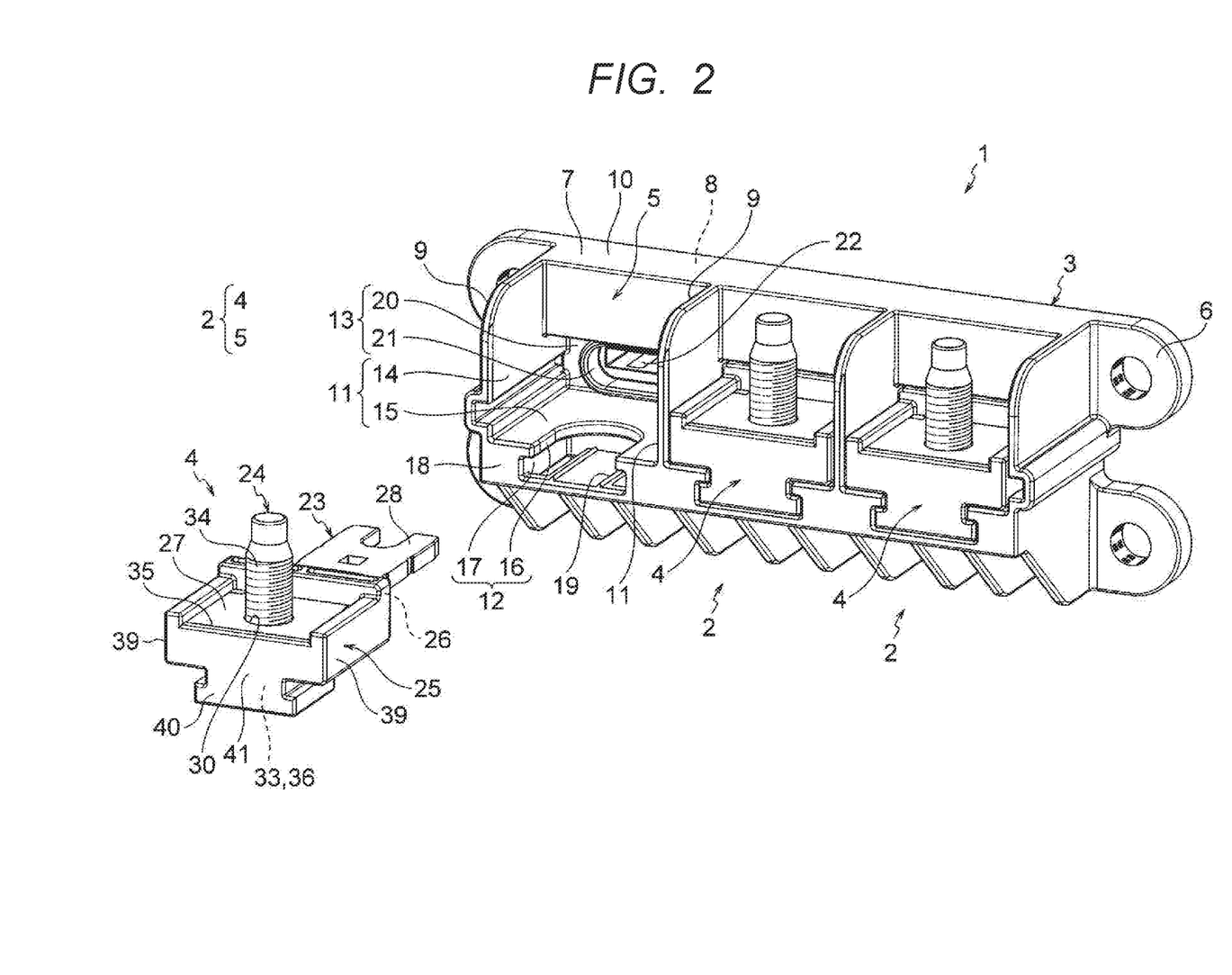

Hereinafter, embodiments of the present application will be described in detail with reference to the drawings. FIGS. 1A and 1B illustrate a triple terminal base 1 according to an embodiment of the present invention, where FIG. 1A is a perspective view and FIG. 1B is a plan view. FIG. 2 is an exploded perspective view of the triple terminal base 1 of FIGS. 1A and 1B, FIGS. 3A and 3B illustrate a housing, and FIGS. 4A and 4B illustrate a bus bar unit.

In FIGS. 1A, 1B and 2, the triple terminal base 1 is to be attached to a wall W of a metal apparatus box A of an in-vehicle apparatus mounted on an automobile. The in-vehicle apparatus includes an apparatus body AB housed in the apparatus box B and a wire harness WH electrically configured to be connected to the apparatus body AB via the triple terminal base 1. FIG. 1B schematically illustrates the apparatus body AB, the apparatus box B, the wire harness WH and the electrical connection between the wire harness WH and the apparatus body AB that is provided by the triple terminal base 1. The triple terminal base 1 is obtained by integrating three terminal bases 2 for input and output. The triple terminal base 1 includes a triple housing 3 and three bus bar units 4. Although the three terminal bases 2 are integrated in the present embodiment, the present invention is not limited thereto, and, for example, a terminal base 2 may be used alone.

In FIGS. 1A, 1B and 2, the three terminal bases 2 have the same basic shape. For this reason, the following description will be made with reference to the terminal base 2 shown on the left as a representative of the three. The terminal base 2 includes a housing 5 of the triple housing 3, which will be described later, and a bus bar unit 4 that is to be assembled to the housing 5. In FIGS. 1A to 3B, the triple housing 3 is a resin molded product, and is formed by integrating three housings 5. The three housings 5 may form a one-piece structure. A plurality of fixing legs C for attaching to the wall W are formed on the triple housing 3.

Figure 3A:
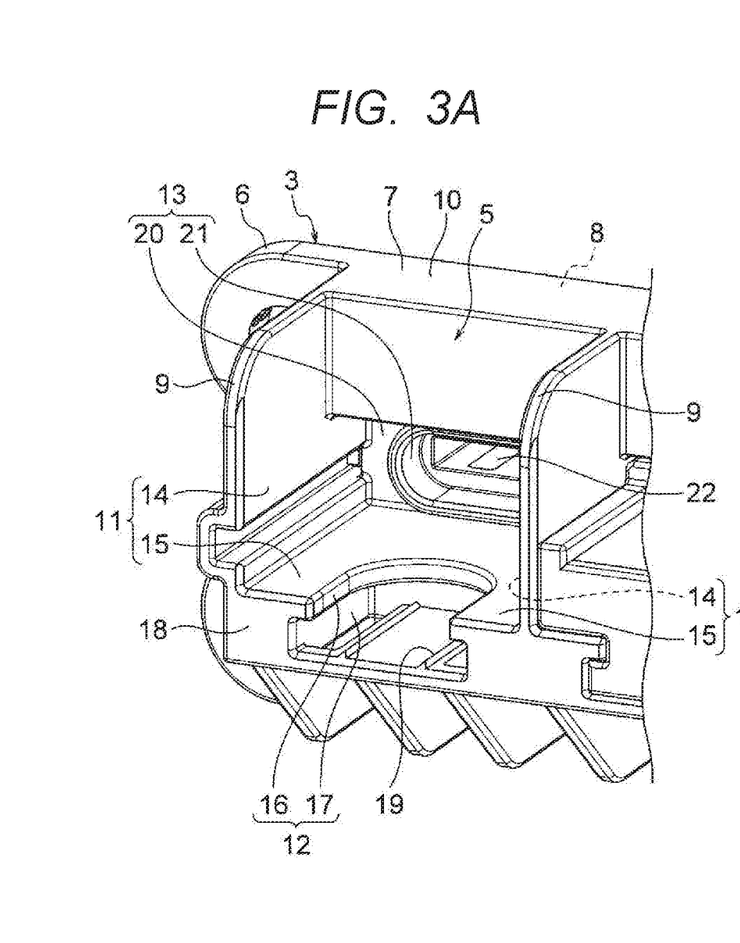
FIG. 3A is a perspective view.
Figure 3B:
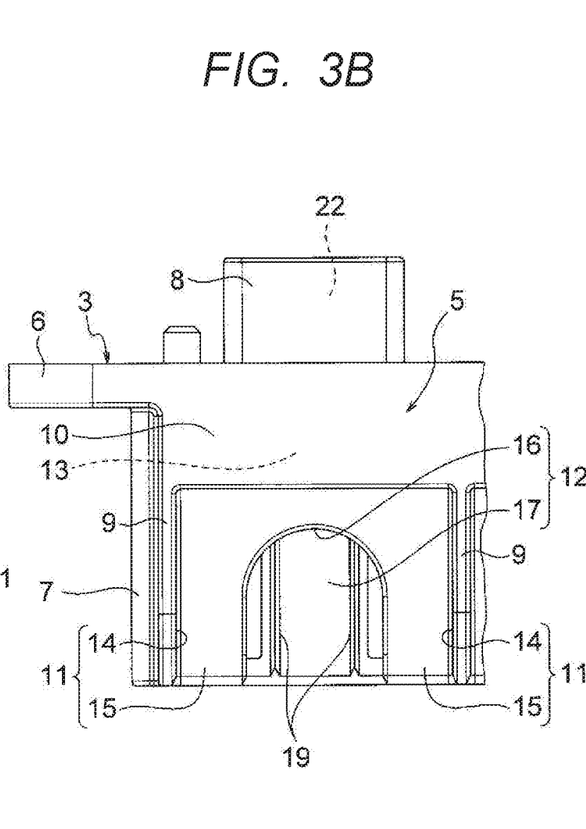
Figure 4A:
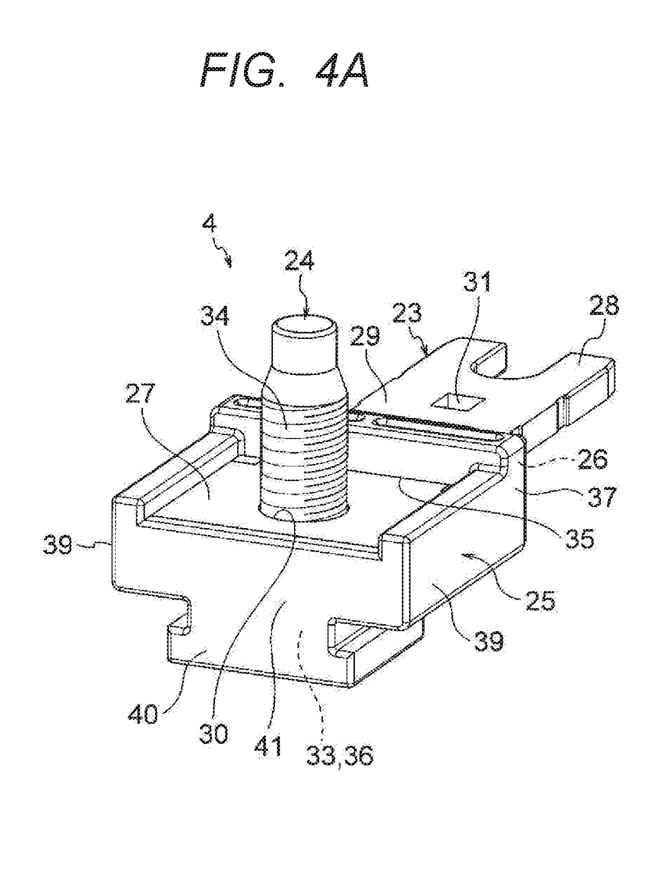
FIG. 4A is a perspective view.
Figure 4B:
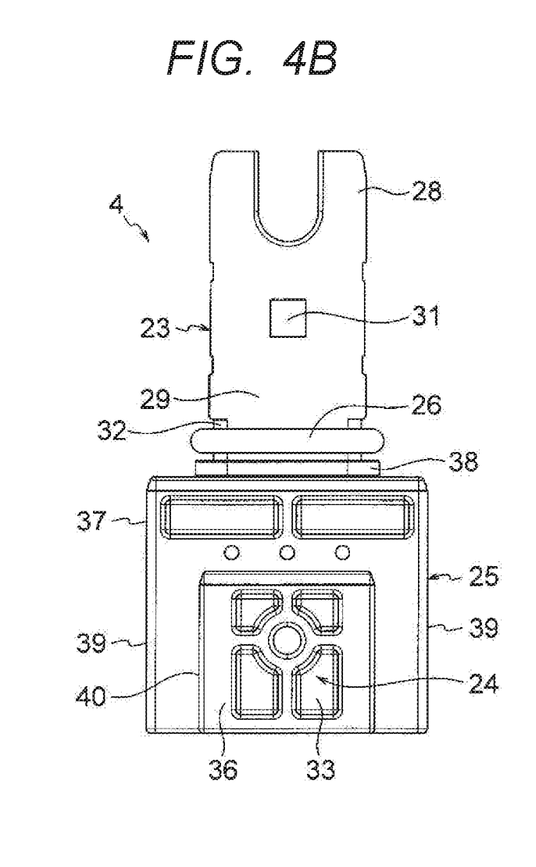
FIG. 4B is a bottom view.

In FIGS. 2, 3A, and 3B, as viewed from an outer side, the housing 5 is formed in an illustrated shape having a housing body 7 and a wall insertion portion 8 continuous with the housing body 7. When the housing 5 is attached to the wall W, the housing body 7 is disposed on the outer side of the wall W. When the housing 5 is attached to the wall W, the wall insertion portion 8 penetrates the wall \V, and a front end side of the wall insertion portion 8 is disposed on an inner side of the wall V. Bolts (not shown) are used to fix the housing 5 with respect to the wall W. The bolts are screwed into the wall W in a state respectively inserted into the fixing legs 6.

In FIGS. 2, 3A, and 3B, the housing body 7 includes a pair of side walls 9 and a back wall 10. The pair of side walls 9 and the back wall 10 are formed in an angled U shape in a plan view. The pair of side walls 9 are formed as partition walls from the adjacent housings 5. The back wall 10 is formed as a partition wall from the wall W. A first guide portion 11, a second guide portion 12, and a recessed accommodating portion 13 are formed on the housing body 7. The first guide portion 11 and the second guide portion 12 are formed as portions that guide a first slide portion 39 and a second slide portion 40 of a holder 25, which will be described later, of the bus bar unit 4. The recessed accommodating portion 13 is formed as a portion that accommodates an O-ring 26, which will be described later, and a portion that accommodates an O-ring pressing portion 38, which will be described later, in the holder 25.

In FIGS. 2, 3A, and 3B, the first guide portion 11 includes inner surfaces 14 of the pair of side walls 9 and a bottom surface denoted by a reference numeral 15. The second guide portion 12 includes a notch 16 on the bottom surface 15 and an insertion recess 17 formed below the notch 16. The notch 16 and the insertion recess 17 are formed so as to be notched from a front end 18 of the housing body 7 (a surface on a near side of the drawing) along a sliding direction of the bus bar unit 4, and the insertion recess 17 is notched so as to open at the front end 18 slightly wider than the notch 16. A reference numeral 19 in the insertion recess 17 denotes a press-fit rib with respect to the bus bar unit 4.

In FIGS. 2, 3A, and 3B, the recessed accommodation portion 13 is formed on a portion where a part of the back wall 10 is recessed rearward. The recessed accommodating portion 13 has a holder accommodating portion 20 and an O-ring accommodating portion 21. A bus bar locking portion 22, which will be described later, of the wall insertion portion 8 is formed on the O-ring accommodating portion 21 so as to communicate with the O-ring accommodating portion 21. The recessed accommodation portion 13 (O-ring accommodating portion 21) is formed on a portion of the bus bar unit 4 through which a bus bar 23 runs, which will be described later.

In FIGS. 3A and 3B, the wall insertion portion 8 has the bus bar locking portion 22 communicating with the recessed accommodating portion 13. The bus bar locking portion 22 is formed as a portion through which the bus bar 23 is inserted, which will be described later, of the bus bar unit 4, and as a portion that locks the bus bar 23. The portion through which the bus bar 23 penetrates is formed to be a through hole that corresponds to a same shape and size as a cross-section of the bus bar 23. The portion that locks the bus bar 23 of the bus bar locking portion 22 is formed so as to have a housing-side locking portion (not shown). The housing-side locking portion is a flexible arm-shaped portion, and has a locking projection formed in the vicinity of a tip end thereof. The housing-side locking portion is formed so as to be able to hook and lock a bus bar-side locking portion 31, which will be described later, of the bus bar 23.

In FIGS. 2, 4A, and 4B, the bus bar unit 4 includes the bus bar 23, a bolt 24, the holder 25, and the O-ring 26. The bus bar unit 4 is to be assembled to a predetermined housing 5 by being slid into the housing 5. The bus bar unit 4 has a structure in which the bus bar 23 and the bolt 24 are insert-molded into and integrated with the holder 25.

In FIGS. 2, 4A, and 4B, the bus bar 23 is formed by punching out a relatively thick metal plate having conductivity. The bus bar 23 is provided as a member necessary for electrical connection between the inner side and the outer side of the wall W (see FIGS. 1A and 1B). The bus bar 23 has a first connection portion 27 for electrical connection with the outer side, a second connection portion 28 for electrical connection with the inner side, and a bus bar middle 29 (middle) located therebetween. The bus bar 23 is formed in a straight strip plate shape. A circular bolt insertion hole 30 runs through the first connecting portion 27. The second connection portion 28 is formed so that the second connection portion 28 protrudes from the wall insertion portion 8 when the bus bar unit 4 is assembled to the housing 5. The bus bar middle 29 is formed on a portion of the bus bar 23 that runs on and locked by the bus bar locking portion 22 of the wall insertion portion 8. The bus bar-side locking portion 31 to be hooked and locked by the housing-side locking portion (not shown) is formed in the bus bar middle portion 29. The bus bar-side locking portion 31 is formed into a rectangular penetrating hole. A reference numeral 32 in the bus bar middle 29 denotes an O-ring mounting portion to which the O-ring 26 is to be attached.

In FIGS. 2, 4A, and 4B, the bolt 24 includes a head 33 (bolt head) having a square shape in a plan view, and a shaft 34 (bolt shaft) extending straight from inside the head 33 in a thickness direction of the head 33. The head 33 has a predetermined thickness, and an outer periphery of the head 33 is held by a bolt holding portion 36, which will be described later, of the holder 25 over the entire circumference. Since the head 33 is square in a plan view, the head 33 is to be fixed from four sides by the bolt holding portion 36. An outer surface of the head 33 in the thickness direction is also held by the bolt holding portion 36 (partially covered by insert molding in the present embodiment). What is different from the related art is that the bolt 24 is held by the holder 25 (not directly held by the housing 5).

In FIGS. 2, 4A, and 4B, the holder 25 is formed as a resin molded portion in a state where the first connection portion 27 of the bus bar 23 and the head 33 of the bolt 24 are to be held by insert molding. A reference numeral 35 in the holder 25 denotes a bus bar holding portion that holds the first connection portion 27 of the bus bar 23. A reference numeral 36 denotes a bolt holding portion that holds the head 33 of the bolt 24. The holder 25, including the bolt holding portion 36, may have a one-piece structure. In the holder 25 as described above, an accommodated portion 37 to be accommodated in the holder accommodating portion 20, the O-ring pressing portion 38 to be accommodated in the O-ring accommodating portion 21, the first slide portion 39 to be guided by the first guide portion 11 of the housing 5, and the second slide portion 40 to be guided by the second guide portion 12 of the housing 5 are formed integrally. The O-ring pressing portion 38 is formed so as to be able to restrict movement of the O-ring 26 accommodated in the O-ring accommodating portion 21. The bus bar unit 4 is to be assembled to the housing 5 by pressing a pressing surface 41 of the holder 25.

In FIGS. 4A and 4B, the O-ring 26 is formed into an annular shape that can be mounted to the O-ring mounting portion 32 of the bus bar 23. As the O-ring 26, a known O-ring is employed. The O-ring 26 is provided as a component for waterproofing between the bus bar 23 and the housing 5. With the bus bar 23 being assembled to the housing 5, the O-ring 26 is to be accommodated in the O-ring accommodating portion 21 of the recessed accommodating portion 13 in a watertight manner.

In FIGS. 1A and 1B, the terminal base 2 having the above-described configuration and structure completes the electrical connection by first inserting a terminal provided at a wire end of a wire harness (not shown) into the shaft 34 of the bolt 24, and then tightening the terminal and the bus bar 23 with a nut (not shown) at a predetermined torque. At the time of electrical connection, although a force to rotate the head 33 is applied to the head 33 of the bolt 24, since the head 33 is held by the bolt holding portion 36 via insert molding (fixed from four sides), and is held by the holder 25 instead of the housing 5, different from the related art, the housing 0.5 will be less affected by the force. Therefore, according to the terminal base 2 (according to the triple terminal base 1), as compared with the related art, a holding force can be significantly improved, and damage to the housing 5 during electrical connection can be prevented.

According to the terminal base 2, since the bolt 24 is held by the holder as described above, it is possible to prevent the bolt 24 from falling off along the sliding direction. Further, according to the terminal base 2, since the bolt 24 is assembled to the housing 5 via the holder 25, it is possible to prevent the housing 5 from being abraded. In other words, in a case of using a metal bolt and a resin housing, the housing may be scraped when the bolt slides. However in the terminal base 2, the holder 25 and the housing 5 are both made of resin. Therefore, even when the holder 25 and the housing 5 slide with respect to each other, abrasion does not occur. Since abrasion does not occur, it is also possible to prevent foreign matter from entering.

Figure 5:
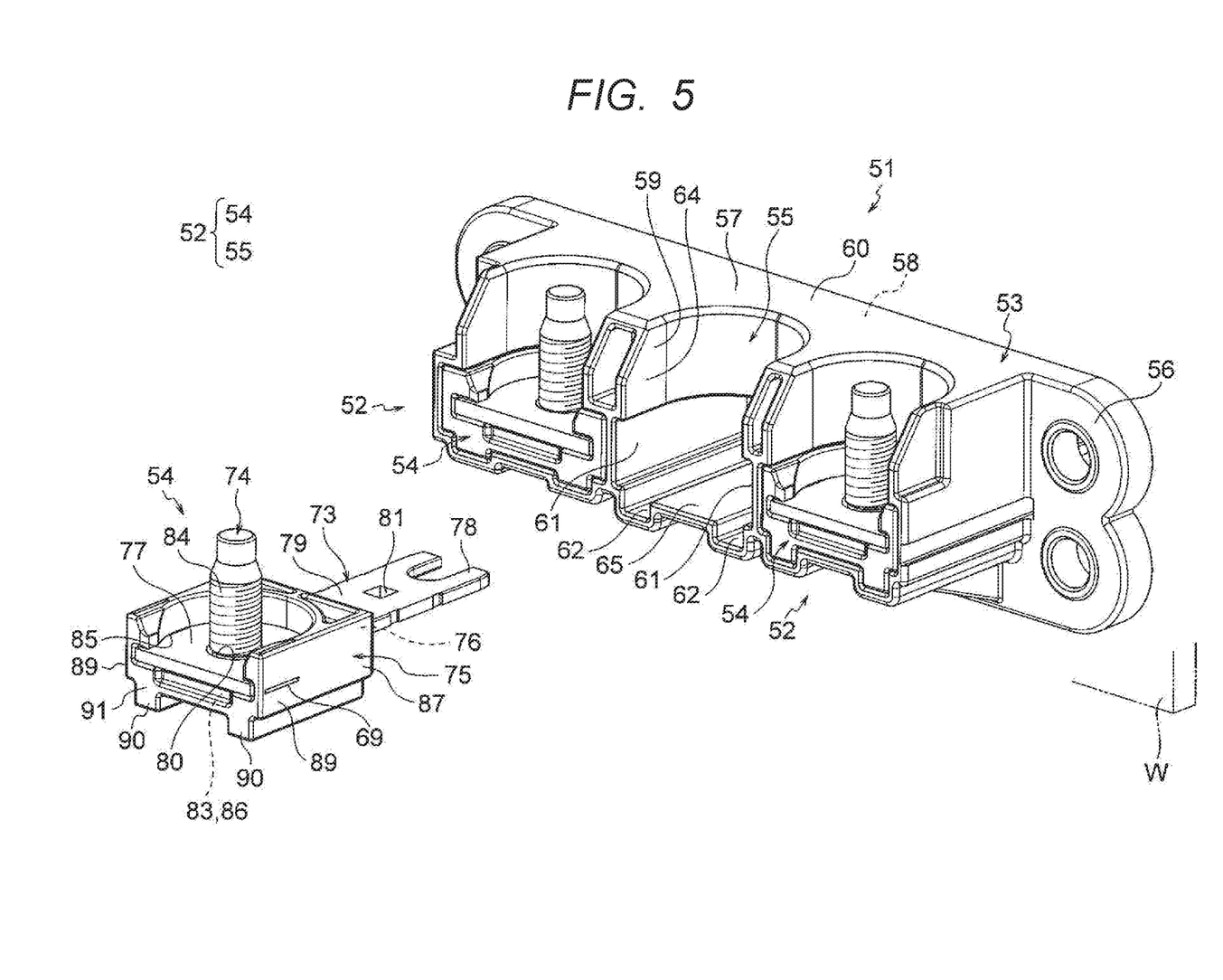
FIG. 5 is an exploded perspective view of a triple terminal base according to another embodiment of the present invention.
Figure 6A:
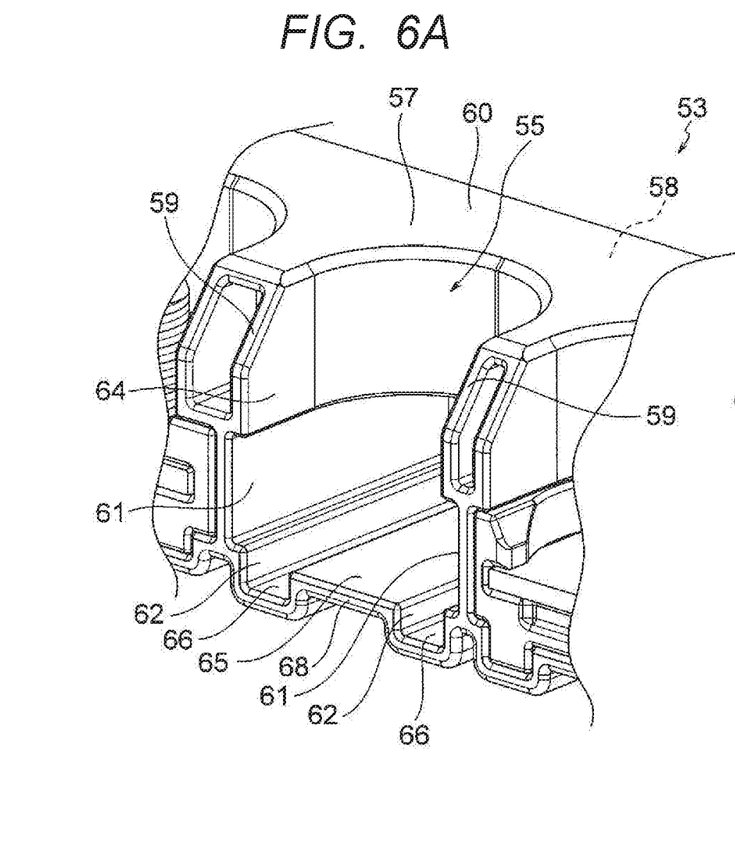
FIG. 6A is a perspective view.
Figure 6B:
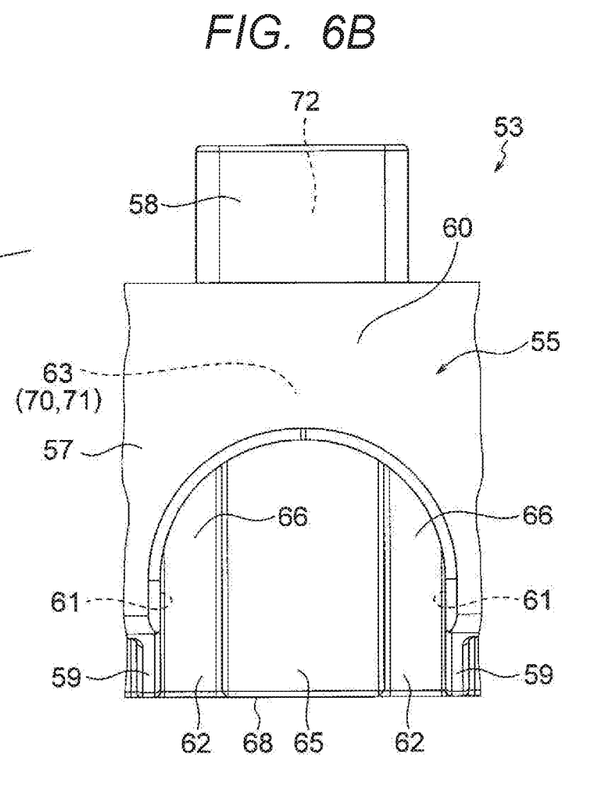
FIG. 6B is a plan view.
Figure 7A:
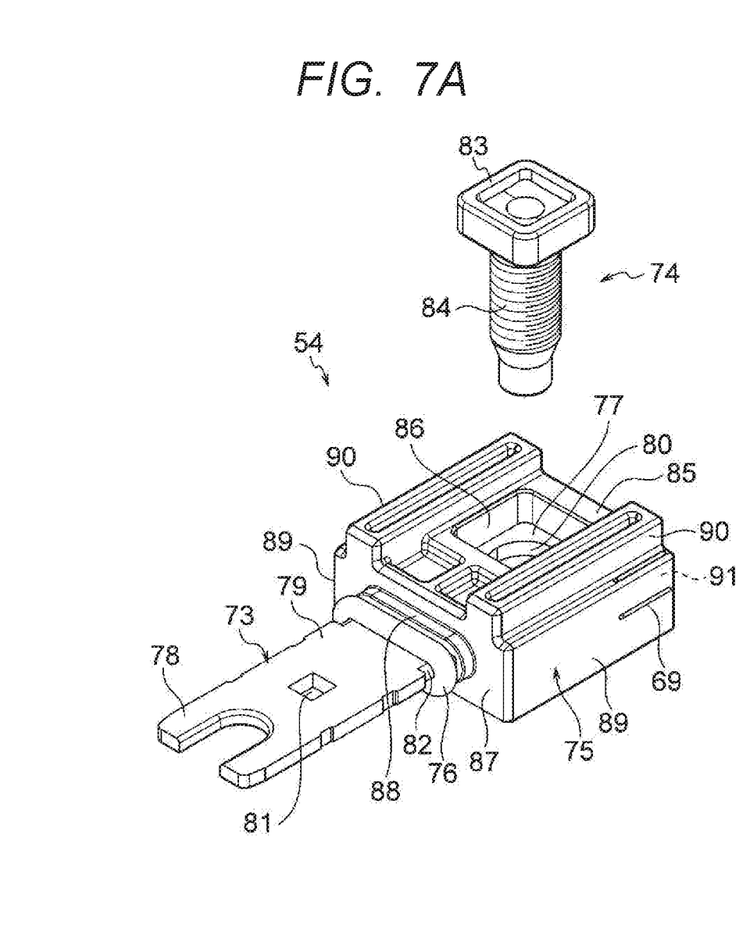
FIG. 7A is an exploded perspective view as viewed from a bottom surface side.
Figure 7B:
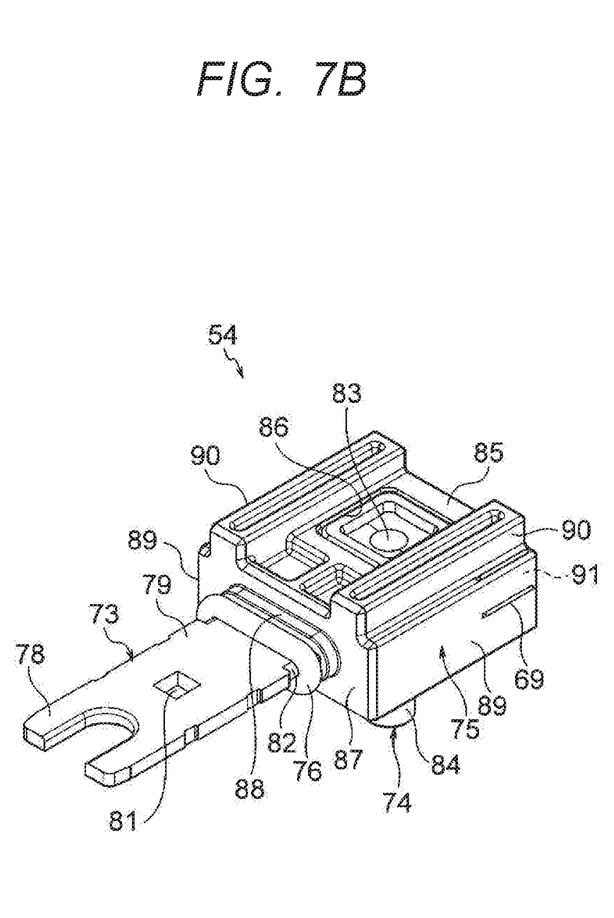

Another embodiment of the present invention will be described below with reference to the drawings. FIG. 5 is an exploded perspective view of a triple terminal base 51. FIGS. 6A and 6B illustrate a housing, and FIGS. 7A and 7B illustrate a bus bar unit.

In FIG. 5, the triple terminal base 51 is attached to the wall W of the metal apparatus box of the in-vehicle apparatus mounted on the automobile. The triple terminal base 51 is obtained by putting together three terminal bases 52 for input and output. The triple terminal base 51 includes a triple housing 53 and three bus bar units 54. Although the three terminal bases 52 are integrated in the present embodiment, the present invention is not limited thereto, and, for example, a terminal base 52 may be used alone.

In FIGS. 5, 6A, and 6B, the three terminal bases 52 have the same basic shape (sizes thereof are slightly different in this embodiment). For this reason, the following description will be made with reference to the terminal base 52 shown in the middle in FIG. 5 as a representative of the three. The terminal base 52 includes a housing 55 of the triple housing 53, which will be described later, and a bus bar unit 54 that is to be assembled to the housing 55. In FIGS. 5, 6A, and 6B, the triple housing 53 is a resin molded product, and is formed by integrating three housings 55. The three housings 55 may form a one-piece structure. A plurality of fixing legs 56 for attaching to the wall W are formed on the triple housing 53.

In FIGS. 5, 6A, and 6B, as viewed from an outer side, the housing 55 is formed in an illustrated shape having a housing body 57 and a wall insertion portion 58 continuous with the housing body 57. When the housing 55 is attached to the wall \V, the housing body 57 is disposed on the outer side of the wall W. When the housing 55 is attached to the wall W, the wall insertion portion 58 penetrates the wall W, and a front end side of the wall insertion portion 58 is disposed on an inner side of the wall W. Bolts (not shown) are used to fix the housing 55 with respect to the wall W. The bolts are screwed into the wall W in a state respectively inserted into the fixing legs 56.

In FIGS. 5, 6A, and 6B, the housing body 57 includes a pair of side walls 59 and a back wall 60. The pair of side walls 59 and the back wall 60 are formed in a curved U shape in a plan view. The pair of side walls 59 are formed as partition walls from the adjacent housings 55. The back wall 60 is formed as a partition wall from the \vall W. A first guide portion 61, second guide portions 62, and a recessed accommodating portion 63 (see FIG. 9) are formed on the housing body 57. The first guide portion 61 and the second guide portions 62 are formed as portions that guide a first slide portion 89 and a second slide portion 90 of a holder 75, which will be described later, of the bus bar unit 54. The recessed accommodating portion 63 is formed as a portion that accommodates an O-ring 76, which will be described later, and a portion that accommodates an O-ring pressing portion 88, which will be described later, in the holder 75.

In FIGS. 5, 6A, and 6B, the first guide portion 61 is formed by recessing inner surfaces 64 of the pair of side walls 59. The first guide portion 61 is formed by also utilizing a bottom surface denoted by a reference numeral 65. The bottom surface 65 is also formed as a surface for receiving a head 83 of a bolt 74, which will be described later. On the other hand, the second guide portions 62 are formed as portions where left and right sides of the bottom surface 65 are recessed. In the present embodiment, a pair of second guide portions 62 are formed. A bottom 66 of each of the second guide portions 62 is formed into a flat surface (in a later-described example, a rib 112 is formed in a protruding manner). The second guide portion 62 is formed so as to extend straight along a sliding direction of the bus bar unit 54 from a front end 68 (a portion on the near side of the drawing) of the housing body 57. Different from the foregoing embodiment, a press-fit rib 69 is formed on a side of the bus bar unit 54 (as one example).

In FIGS. 6A and 6B, the recessed accommodation portion 63 is formed on a portion where a part of the back wall 60 is recessed rearward. The recessed accommodating portion 63 has a holder accommodating portion 70 and an O-ring accommodating portion 71 (see FIG. 9). A bus bar locking portion 72, which will be described later, of the wall insertion portion 58 is formed on the O-ring accommodating portion 71 so as to communicate with the O-ring accommodating portion 71. The recessed accommodation portion 63 (O-ring accommodating portion 71) is formed on a portion through which a bus bar 73 runs, which will be described later, of the bus bar unit 54.

In FIGS. 6A and 69, the wall insertion portion 58 has the bus bar locking portion 72 communicating with the recessed accommodating portion 63. The bus bar locking portion 72 is formed as a portion through which the bus bar 73 runs, which will be described later, of the bus bar unit 54, and as a portion that locks the bus bar 73. The portion through which the bus bar 73 runs of the bus bar locking portion 72 is formed to be a through hole that corresponds to a same shape and size as a cross-section of the bus bar 73. The portion that locks the bus bar 73 of the bus bar locking portion 72 is formed so as to have a housing-side locking portion (not shown). The housing-side locking portion is a flexible arm-shaped portion, and has a locking projection formed in the vicinity of a tip end thereof. The housing-side locking portion is formed so as to be able to hook and lock a bus bar-side locking portion 81, which will be described later, of the bus bar 73.

In FIGS. 5, 7A, and 79, the bus bar unit 54 includes the bus bar 73, a bolt 74, the holder 75, and the O-ring 76. The bus bar unit 54 is to be assembled to a predetermined housing 55 by being slid into the housing 55. The bus bar unit 54 has, for example, a structure in which only the bus bar 73 is insert-molded into and integrated with the holder 75. For example, the bus bar 73 may be inserted into the holder 75 so as to be first integrated therewith, and then the bolt 74 and the O-ring 76 may be assembled together.

In FIGS. 5, 7A, and 7B, the bus bar 73 is formed by punching out a relatively thick metal plate having conductivity. The bus bar 73 is provided as a member necessary for electrical connection between the inner side and the outer side of the wall W. The bus bar 73 has a first connection portion 77 for electrical connection with the outer side, a second connection portion 78 for electrical connection with the inner side, and a bus bar middle 79 (middle) located therebetween. The bus bar 73 is formed in a straight strip plate shape. A circular bolt insertion hole 80 runs through the first connecting portion 77. The second connection portion 78 is formed so that the second connection portion 78 protrudes from the wall insertion portion 58 when the bus bar unit 54 is assembled to the housing 55. The bus bar middle 79 is formed on a portion of the bus bar 73 that runs on and locked by the bus bar locking portion 72 of the wall insertion portion 58. The bus bar-side locking portion 81 to be hooked and locked by the housing-side locking portion (not shown) is formed on the bus bar middle portion 79. The bus bar-side locking portion 81 is formed into a rectangular penetrating hole. A reference numeral 82 in the bus bar middle 79 denotes an O-ring mounting portion to which the O-ring 76 is to be attached.

In FIGS. 5, 7A, and 7B, the bolt 74 includes a head 83 (bolt head) having a square shape in a plan view, and a shaft 84 (bolt shaft) extending straight from inside the head 83 in a thickness direction of the head 83. The head 83 has a predetermined thickness, and an outer periphery of the head 83 is held by a bolt holding portion 86, which will be described later, of the holder 75 over the entire circumference. Since the head 83 is square in a plan view, the head 83 is to be fixed from four sides by the bolt holding portion 86. What is different from the related art is that the bolt 74 is inserted into and held by the holder 75 (not directly held by the housing 55).

In FIGS. 5, 7A, and 7B, the holder 75 is formed as a resin molded portion in a state where the first connection portion 77 of the bus bar 73 is to be held by insert molding. A reference numeral 85 in the holder 75 denotes a bus bar holding portion that holds the first connection portion 77 of the bus bar 73. A reference numeral 86 denotes a bolt holding portion that holds the head 83 of the bolt 74. In the holder 75 as described above, an accommodated portion 87 to be accommodated the holder accommodating portion 70, the O-ring pressing portion 88 to be accommodated the O-ring accommodating portion 71, the first slide portion 89 to be guided by the first guide portion 61 of the housing 55, and the second slide portion 90 to be guided by the second guide portion 62 of the housing 55 are formed integrally. The O-ring pressing portion 88 is formed so as to be able to restrict movement of the O-ring 76 accommodated in the O-ring accommodating portion 71. The press-fit rib 69 is disposed on an outer surface of the first slide portion 89. The bus bar unit 54 is to be assembled to the housing 55 by pressing a pressing surface 91 of the holder 75. When the bus bar unit 54 is assembled to the housing 55, the head 83 of the bolt 74 is to be in a state where an outer surface thereof in the thickness direction is received by the bottom surface 65 of the housing 55.

In FIGS. 7A and 7B, the O-ring 76 is formed into an annular shape that can be mounted to the O-ring mounting portion 82 of the bus bar 73. As the O-ring 76, a known O-ring is employed. The O-ring 76 is provided as a component for waterproofing between the bus bar 73 and the housing 55. With the bus bar 73 being assembled to the housing 55, the O-ring 76 is to be accommodated in the O-ring accommodating portion 71 of the recessed accommodating portion 63 in a watertight manner.

In FIG. 5, the terminal base 52 having the above-described configuration and structure completes the electrical connection by first inserting a terminal provided at a wire end of a wire harness (not shown) into the shaft 84 of the bolt 74, and then tightening the terminal and the bus bar 73 with a nut (not shown) at a predetermined torque. At the time of electrical connection, although a force to rotate the head 83 is applied to the head 83 of the bolt 74, since the head 83 is held by the bolt holding portion 86 of the holder 75 (fixed from four sides), and is held by the holder 75 instead of the housing 55, different from the related art, the housing 55 will be less affected by the force. Therefore, according to the terminal base 52 (according to the triple terminal base 51), as compared with the related art, a holding force can be significantly improved, and damage to the housing 55 during electrical connection can be prevented.

Figure 8:
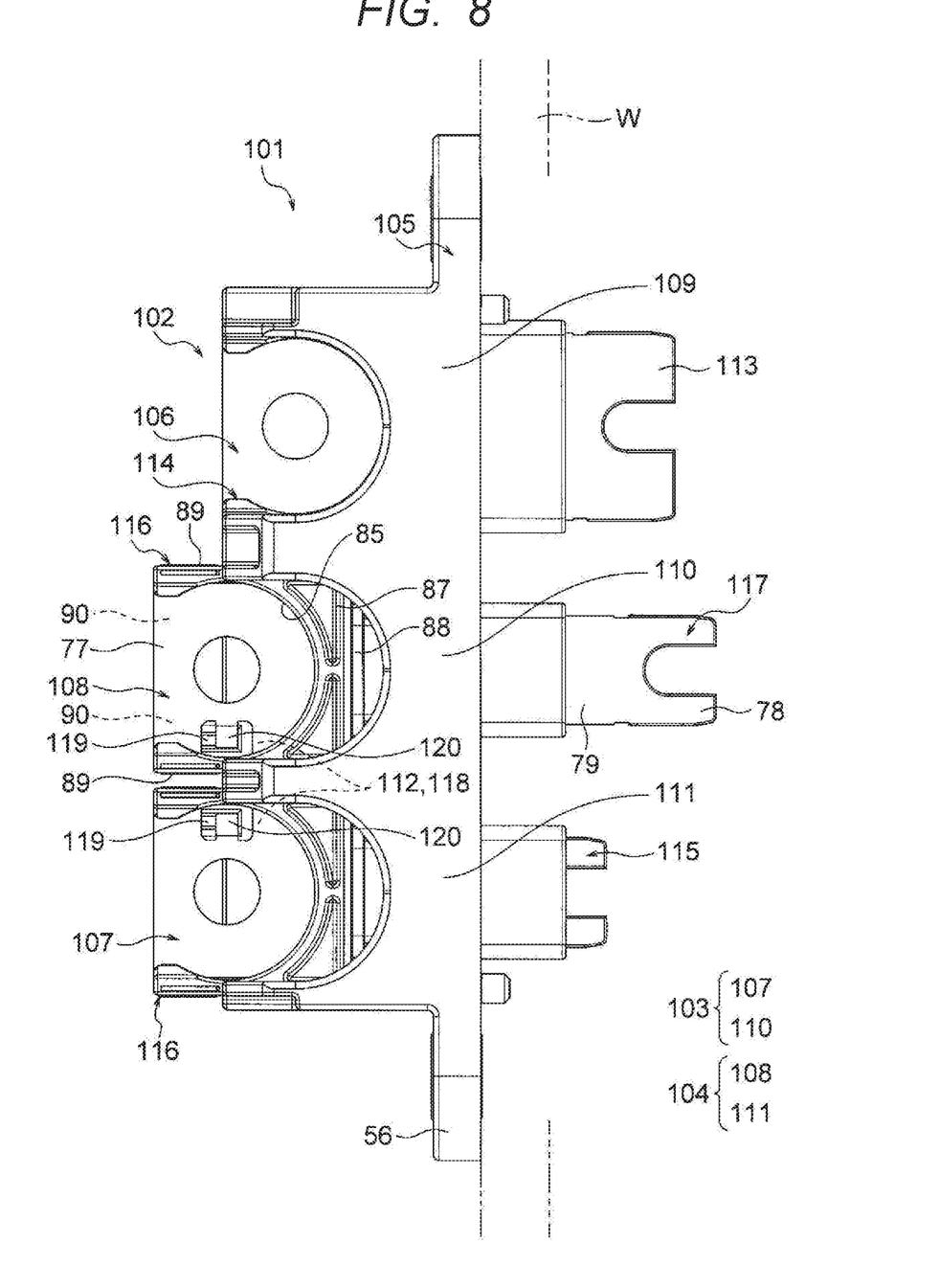
FIG. 8 is a plan view of a triple terminal base according to another embodiment of the present ntion when being erroneously assembled.
Figure 9:
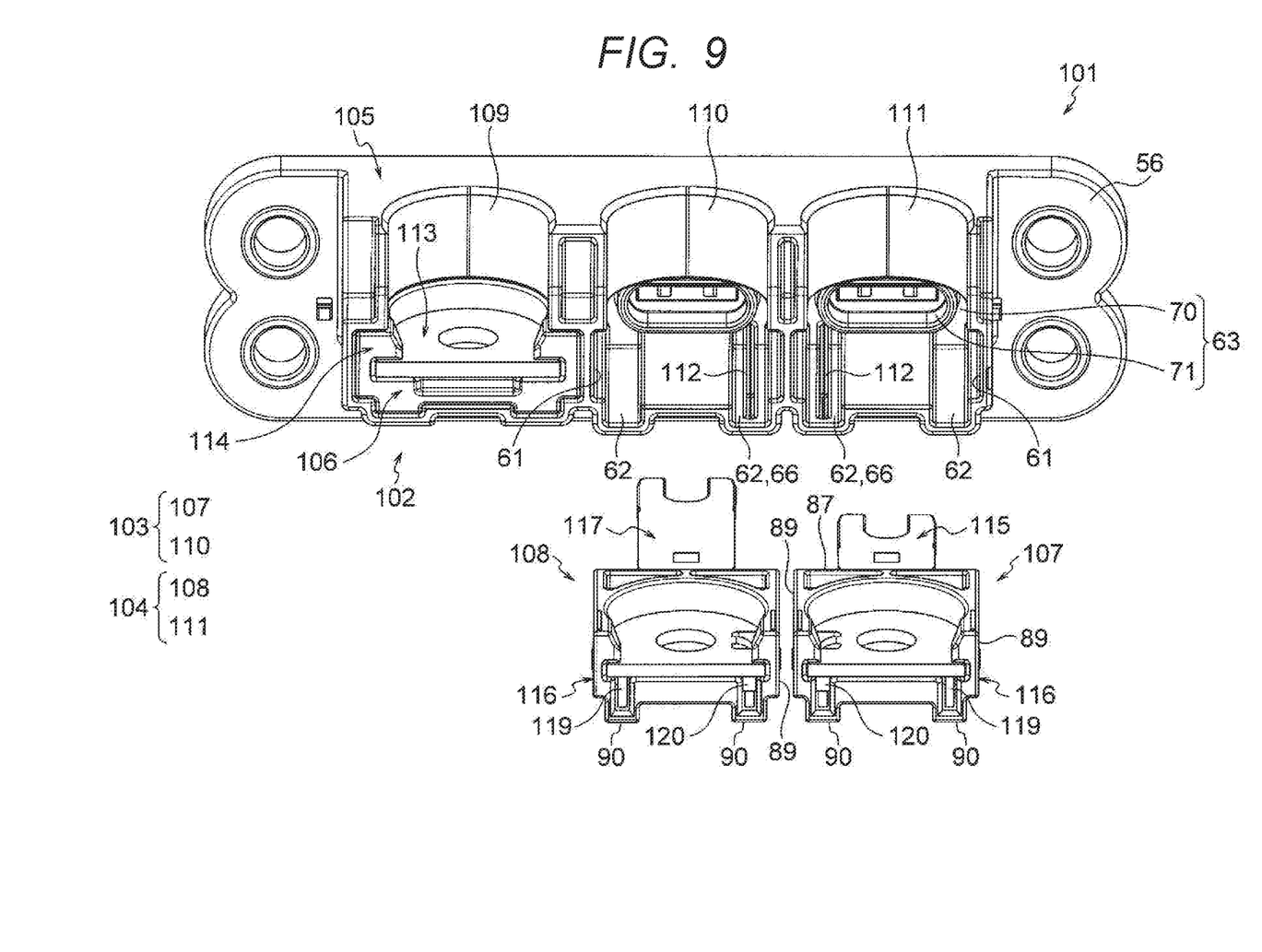
FIG. 9 is an exploded perspective view of the triple terminal base of FIG. 8.
Figure 11A:
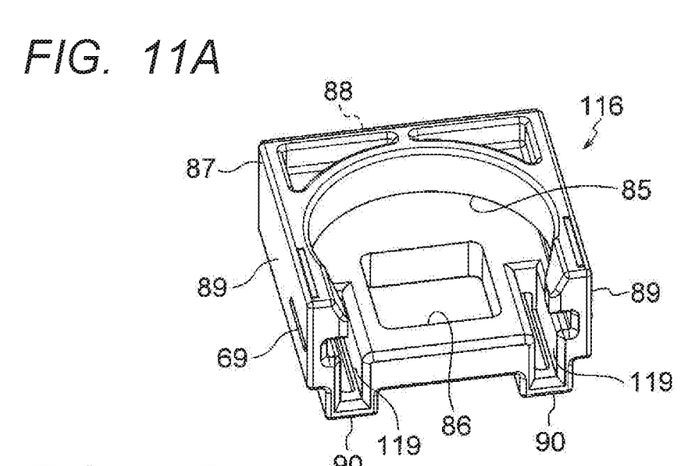
FIG. 11A is a perspective view.
Figure 11B:
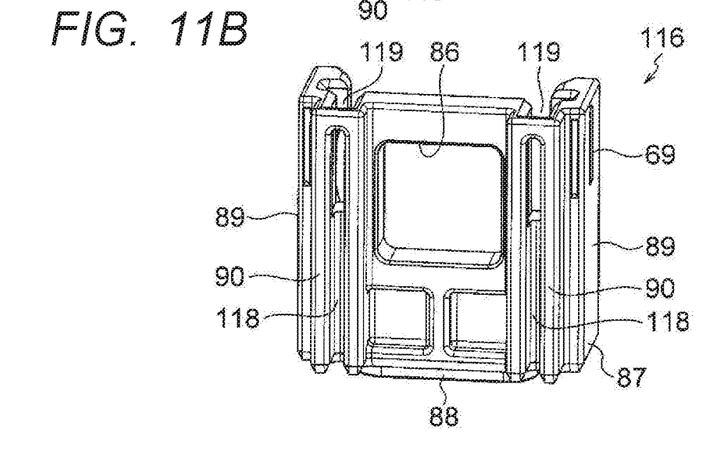
FIG. 11B is a perspective view of the holder as viewed from the bottom surface side.
Figure 11C:
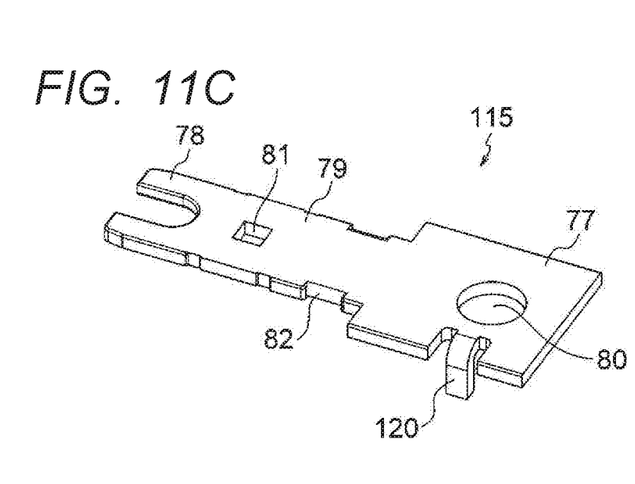
FIG. 11C is a perspective view of the bus bar.
Figure 12:
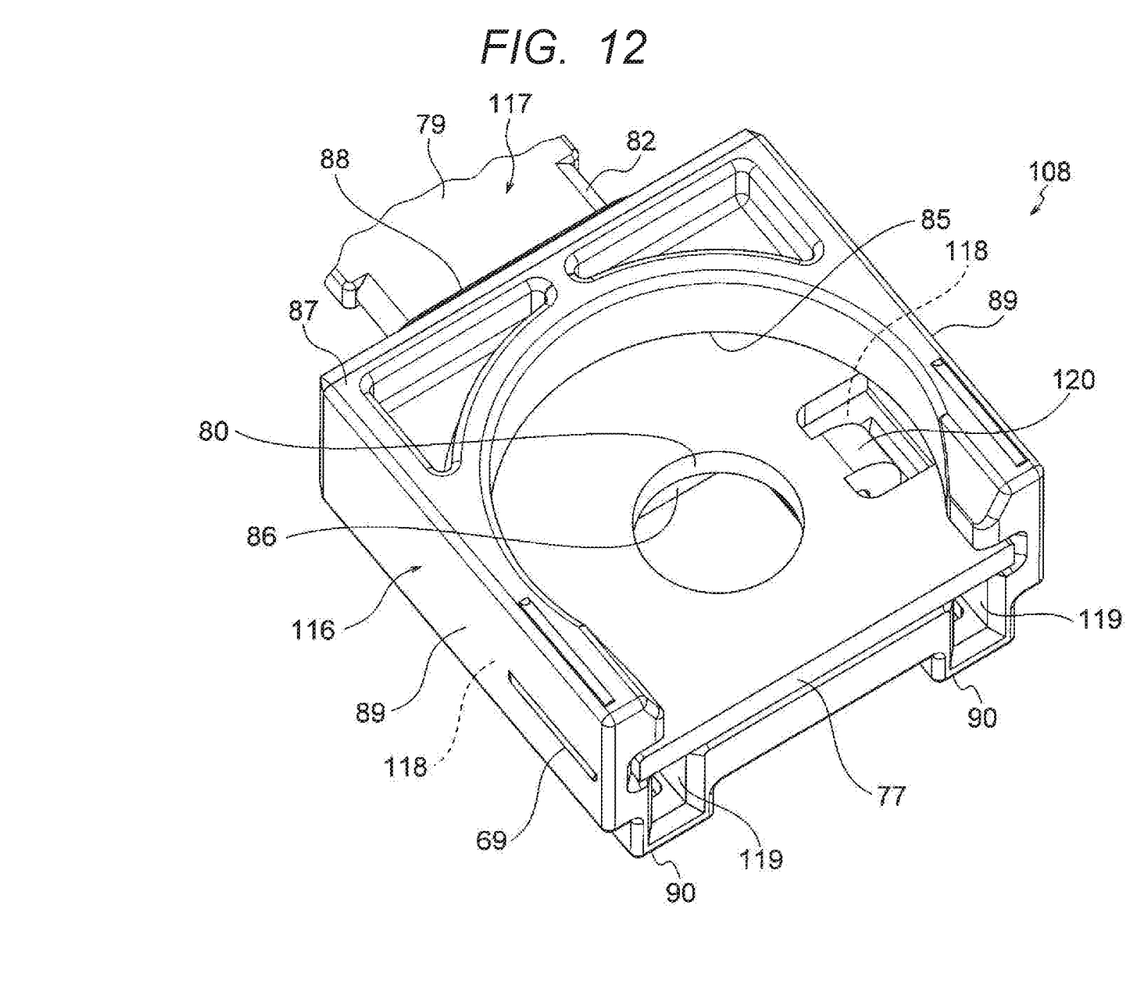
FIG. 12 is a perspective view of a protrusion of the bus bar and slits of the holder.

Another embodiment of the present invention will be described below with reference to the drawings. FIG. 8 is a plan view of a triple terminal base 101 when being erroneously assembled. FIG. 9 is an exploded perspective view of the triple terminal base 101, FIG. 10 is a perspective view of the triple terminal base 101 as viewed from a bottom surface side, FIGS. 11A to 11C illustrate a holder and a bus bar, and FIG. 12 is a perspective view of a protrusion of the bus bar and slits of the holder.

In this embodiment, a structure capable of preventing erroneous assembly is added to the structure of foregoing embodiment. Therefore, a portion related to erroneous assembly prevention will be mainly described below. The same structures as those of the foregoing embodiment are denoted by the reference numerals, and the description thereof is omitted. For the sake of convenience, illustration of the bolt and the O-ring (see reference numerals 74 and 76 in FIGS. 5, 7A, and 7B) is omitted.

In FIG. 8, a triple terminal base 101 is attached to the wall W of the metal apparatus box of the in-vehicle apparatus mounted on the automobile. The triple terminal base 101 is obtained by putting together three terminal bases 102, 103, 104 for input and output. The triple terminal base 101 includes a triple housing 105 and three bus bar units 106, 107, 108. The triple terminal base 101 is formed so as to be able to prevent erroneous assembly of the bus bar units 107 and 108.

Figure 10:
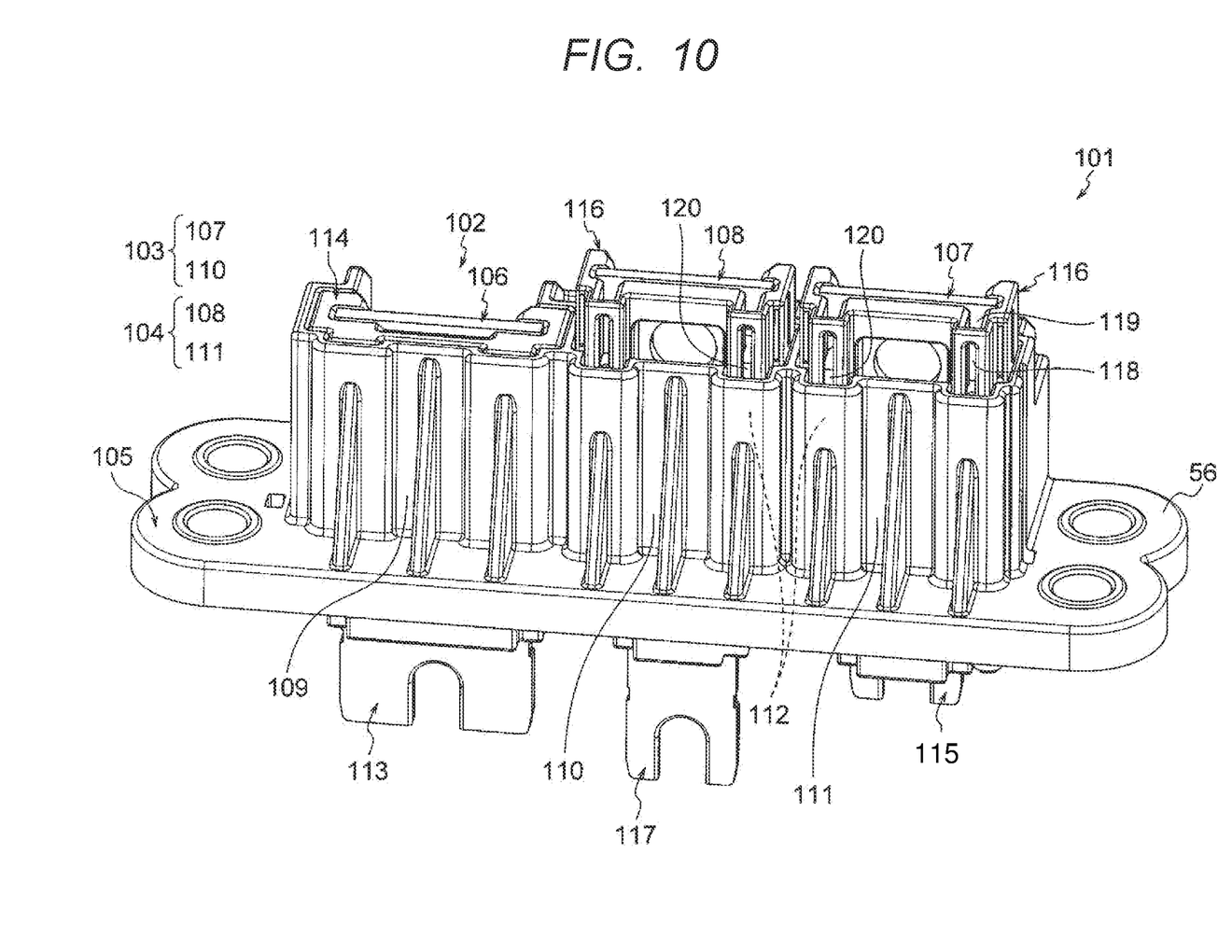
FIG. 10 is a perspective view of the triple terminal base of FIG. 8 as viewed from a bottom surface side.

In FIGS. 8 to 10, the triple housing 105 is a resin molded product, and is formed by integrating three housings 109, 110, 111. Among the housings 109, 110, and 111, portions related to erroneous assembly prevention are formed on the housings 110 and 111.

Specifically, a rib 112 is formed on the bottom 66 of the second guide portion 62 on the right side of the housing 110. Further, a rib 112 is also formed on the bottom 66 of the second guide portion 62 on the left side of the housing 111. The ribs 112 are formed so as to extend straight in an extending direction of the second guide portions 62 at the center of each of the bottoms 66. The ribs 112 are formed into ridge portions that protrude relatively low.

In FIGS. 8 to 12, the bus bar unit 106 includes a bus bar 113 having a wide width, a holder 114 having a wide width to which the bus bar 113 is to be assembled, and a bolt and an O-ring (not shown). The bus bar unit 107 includes a bus bar 115 having a width narrower than the bus bar 113, a shared holder 116 (holder) having a narrow width to which the bus bar 115 is to be assembled, and a bolt and an O-ring (not shown). The bus bar unit 108 includes a bus bar 117 that has a width narrower than the bus bar 113 and the same as the bus bar 115, and that is longer than the bus bar 115, the shared holder 116 having a narrow width to which the bus bar 117 is to be assembled, and a bolt and an O-ring (not shown).

Since the bus bar unit 106 has the wide width, and thus cannot be erroneously assembled to the housing 110 or the housing 111 instead of the housing 109, whereas the bus bar units 107 and 108 may be erroneously assembled as they have the same width. That is, even though the bus bar unit 107 has the housing 110 as an original assembly target, the bus bar unit 107 may be assembled to the housing 111 as shown in the drawings, and even though the bus bar unit 108 has the housing 111 as an original assembly target, the bus bar unit 108 may be assembled to the housing 110 as shown in the drawings. Therefore, as described above, the ribs 112 are formed on the housings 110 and 111, and the portions for preventing erroneous assembly described below are also formed on the bus bar units 107 and 108.

In FIGS. 11A, 11B, 11C, and 12, the bus bar holding portion 85, the bolt holding portion 86, the accommodated portion 87, the O-ring pressing portion 88, the pair of first slide portions 89, and the pair of second slide portions 90 are formed on the shared holder 116 which is a resin molded product. Two slits 118 and 119 are formed on each of the second slide portions 90 as portions that prevent erroneous assembly on the holder side. The first slit 118 is notched so that the rib 112 of the housings 110 and 111 (see FIG. 9) can be inserted. Specifically, the first slit 118 is notched straight from a rear end of the second slide portion 90 so that the rib 112 can be inserted. The first slit 119 is notched so that protrusions 120, which will be described later, of the bus bars 115 and 117 can be inserted. Specifically, the second slit 119 is notched straight from a front end of the second slide portion 90 so that the protrusion 120 can be inserted. The two slits 118 and 119 are formed in a state such that slit inner spaces thereof are continuous.

Each of the bus bars 115 and 117 has the first connection portion 77, the second connection portion 78, and the bus bar middle 79, and the protrusion 120 is formed on the first connection portion 77 as a portion that prevents erroneous assembly on the bus bar side. The protrusion 120 of the bus bar 115 is disposed on the left side of the first connection portion 77, and the protrusion 120 of the bus bar 117 is disposed on the right side of the first connection portion 77. The protrusion 120 is formed by bending. The protrusion 120 is formed into a portion that is inserted into the slit 119 and that protrudes into the second slide portion 90 of the shared holder 116 in a state where the bus bars 115 and 117 are assembled to the housing 55.

In FIGS. 8 to 12, since the triple terminal base 101 includes the ribs 112 of the housings 110 and 111, the slits 118 and 119 of the second slide portions 90, and the protrusions 120 of the bus bars 115 and 117, even if the bus bar unit 107 is assembled to the housing 111 instead of the housing 110 as the original assembly target, the rib 112 and the protrusion 120 abut each other, thereby preventing erroneous assembly. Further, even if the bus bar unit 108 is assembled to the housing 110 instead of the housing 111 as the original assembly target, the rib 112 and the protrusion 120 abut each other, thereby preventing erroneous assembly.

As described above with reference to FIGS. 8 to 12, according to the triple terminal base 101, erroneous assembly of the bus bar units 107 and 108 can be prevented. As can be seen from the above description, the shared holder 116 can be used without being changed into other types. That is, this embodiment can contribute to prevention of an increase in the number of components while preventing erroneous assembly. Prevention of increase in the number of components can facilitate component management and contribute to mold reduction (cost reduction).

According to the exemplary embodiments described above, a terminal base includes a straight, strip plate-shaped bus bar having a first end and a second end, the first end having a bolt insertion hole, a bolt configured to be inserted into the bolt insertion hole for electrical connection, the bolt having a head, a housing into which the bus bar is inserted from the second end of the bus bar such that the second end extends out of the housing, an O-ring configured to be mounted on the bus bar at a middle of the bus bar to seal a gap between the bus bar and the housing and a holder configured to regulate a movement of the O-ring. The holder is provided on the bus bar. The holder includes a bolt holding portion configured to hold an outer periphery of the head of the bolt over an entire circumference of the outer periphery of the head.

According to this terminal base, since the outer periphery of the head of the bolt is held over the entire circumference of the outer periphery of the head of the bolt by the holder, a holding force applied to the head of the bolt can be improved as compared with the related art, thereby preventing the housing being damaged during electrical connection.

The terminal may further include the holder, including the bolt holding portion, that has a one-piece structure.

The terminal base may further include the holder further having a slide portion and the housing having a guide portion configured to guide the slide portion when the holder slides into the housing.

The terminal base may further include the holder further having a plurality of slits, the bus bar having a protrusion configured to protrude into one of the slits and the housing further having a rib configured to be inserted into another one of the slits when the holder slides into the housing.

A triple terminal base includes three terminal bases arranged next to one another. Each of the terminal bases has the configuration described above. The holder of at least one of the terminal bases further includes a plurality of slits. The bus bar of the at least one of the terminal bases includes a protrusion configured to protrude into one of the slits. The housing of the at least one of the terminal bases further includes a rib configured to be inserted into another one of the slits when the holder slides into the housing.

The triple terminal base may further include the housings of the three terminal bases forming a one-piece structure.

An in-vehicle apparatus includes an apparatus body, an apparatus box that houses the apparatus body, the terminal base configured to be attached to a wall of the apparatus box and a wire harness configured to be electrically connected to the apparatus body via the terminal base.

An in-vehicle apparatus comprising an apparatus body, an apparatus box that houses the apparatus body, the triple terminal base configured to be attached to a wall of the apparatus box and a wire harness configured to be electrically connected to the apparatus body via the triple terminal base.

What is claimed is:

1. A terminal base comprising:
a straight, strip plate-shaped bus bar having a first end and a second end, the first end having a bolt insertion hole;
a bolt configured to be inserted into the bolt insertion hole for electrical connection, the bolt having a head;
a housing into which the bus bar is inserted from the second end of the bus bar such that the second end extends out of the housing;
an O-ring configured to be mounted on the bus bar at a middle of the bus bar to seal a gap between the bus bar and the housing; and
a holder configured to regulate a movement of the O-ring, wherein the holder is provided on the bus bar, and
wherein the holder comprises a bolt holding portion configured to hold an outer periphery of the head of the bolt over an entire circumference of the outer periphery of the head.

2. The terminal base according to claim 1,
wherein the holder, including the bolt holding portion, has a one-piece structure.

3. The terminal base according to claim 1,
wherein the holder further comprises a slide portion, and
wherein the housing comprises a guide portion configured to guide the slide portion when the holder slides into the housing.

4. The terminal base according to claim 3,
wherein the holder further comprises a plurality of slits,
wherein the bus bar comprises a protrusion configured to protrude into one of the slits, and
wherein the housing further comprises a rib configured to be inserted into another one of the slits when the holder slides into the housing.

5. A triple terminal base comprising;
three terminal bases arranged next to one another, wherein each of the terminal bases comprising;
a straight, strip plate-shaped bus bar having a first end and a second end, the first end having a bolt insertion hole;
a bolt configured to be inserted into the bolt insertion hole for electrical connection, the bolt having a head;
a housing into which the bus bar is inserted from the second end of the bus bar such that the second end extends out of the housing;
an O-ring configured to be mounted on the bus bar at a middle of the bus bar to seal a gap between the bus bar and the housing; and
a holder configured to regulate a movement of the O-ring, wherein the holder is provided on the bus bar,
wherein the holder comprises a bolt holding portion configured to hold an outer periphery of the head of the bolt over an entire circumference of the outer periphery of the head,
wherein the holder comprises a slide portion,
wherein the housing comprises a guide portion configured to guide the slide portion when the holder slides into the housing,
wherein the holder of at least one of the terminal bases further comprises a plurality of slits,
wherein the bus bar of the at least one of the terminal bases comprises a protrusion configured to protrude into one of the slits, and
wherein the housing of the at least one of the terminal bases further comprises a rib configured to be inserted into another one of the slits when the holder slides into the housing.

6. The triple terminal base according to claim 5,
wherein the housings of the three terminal bases form a one-piece structure.

7. An in-vehicle apparatus comprising:
an apparatus body;
an apparatus box that houses the apparatus body;
a terminal base configured to be attached to a wall of the apparatus box; and
a wire harness configured to be electrically connected to the apparatus body via the terminal base,
wherein the terminal base comprises
a straight, strip plate-shaped bus bar having a first end and a second end, the first end having a bolt insertion hole;
a bolt configured to be inserted into the bolt insertion hole for electrical connection, the bolt having a head;
a housing into which the bus bar is inserted from the second end of the bus bar such that the second end extends out of the housing;
an O-ring configured to be mounted on the bus bar at a middle of the bus bar to seal a gap between the bus bar and the housing; and
a holder configured to regulate a movement of the O-ring, wherein the holder is provided on the bus bar, and
wherein the holder comprises a bolt holding portion configured to hold an outer periphery of the head of the bolt over an entire circumference of the outer periphery of the head.

8. An in-vehicle apparatus comprising:
an apparatus body;
an apparatus box that houses the apparatus body;
a triple terminal base configured to be attached to a wall of the apparatus box, and
a wire harness configured to be electrically connected to the apparatus body via the triple terminal base,
wherein the triple terminal base comprises three terminal bases, each of the three terminal bases comprising;
a straight, strip plate-shaped bus bar having a first end and a second end, the first end having a bolt insertion hole;
a bolt configured to be inserted into the bolt insertion hole for electrical connection, the bolt having a head;
a housing into which the bus bar is inserted from the second end of the bus bar such that the second end extends out of the housing;
an O-ring configured to be mounted on the bus bar at a middle of the bus bar to seal a gap between the bus bar and the housing; and
a holder configured to regulate a movement of the O-ring, wherein the holder is provided on the bus bar, wherein the holder comprises a bolt holding portion configured to hold an outer periphery of the head of the bolt over an entire circumference of the outer periphery of the head, wherein the holder comprises a slide portion, wherein the housing comprises a guide portion configured to guide the slide portion when the holder slides into the housing, wherein the holder of at least one of the terminal bases further comprises a plurality of slits, wherein the bus bar of the at least one of the terminal bases comprises a protrusion configured to protrude into one of the slits, and wherein the housing of the at least one of the terminal bases further comprises a rib configured to be inserted into another one of the slits when the holder slides into the housing.

* * * * *